(12) United States Patent
Kim et al.

(10) Patent No.: US 10,926,990 B2
(45) Date of Patent: Feb. 23, 2021

(54) LIQUID DISPENSOR

(71) Applicant: LG ELECTRONICS INC., Seoul (KR)

(72) Inventors: Youngjin Kim, Seoul (KR); Myounggon Kim, Seoul (KR); Beomchul Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/469,520

(22) PCT Filed: Dec. 18, 2017

(86) PCT No.: PCT/KR2017/014972
§ 371 (c)(1),
(2) Date: Jun. 13, 2019

(87) PCT Pub. No.: WO2018/111057
PCT Pub. Date: Jun. 21, 2018

(65) Prior Publication Data
US 2019/0389712 A1 Dec. 26, 2019

(30) Foreign Application Priority Data
Dec. 16, 2016 (KR) .................. 10-2016-0172958

(51) Int. Cl.
*B67D 1/00* (2006.01)
*B67D 1/08* (2006.01)
(Continued)

(52) U.S. Cl.
CPC .......... *B67D 1/0878* (2013.01); *B67D 1/1405* (2013.01); *C02F 1/325* (2013.01);
(Continued)

(58) Field of Classification Search
USPC ...................................... 250/432 R
See application file for complete search history.

(56) References Cited

U.S. PATENT DOCUMENTS 3,063,841 A * 11/1962 Ash ................ B67D 1/1405
426/416
4,276,256 A * 6/1981 Karamian ............. A61L 2/10
137/241
(Continued)

FOREIGN PATENT DOCUMENTS

KR 20-0327034 9/2003
KR 20-0393066 8/2005
(Continued)

OTHER PUBLICATIONS

International Search Report (with English Translation) and Written Opinion dated Apr. 25, 2018 issued in Application No. PCT/KR2017/014972.

*Primary Examiner* — Phillip A Johnston
(74) *Attorney, Agent, or Firm* — Ked & Associates, LLP (57) ABSTRACT

A water purifier according to an embodiment of the present invention includes a housing accommodating components for generating cold water and/or hot water; and a water chute which protrudes from a front surface of the housing, in which the water chute includes a water cock through which cold water or hot water flows; and a light emitting element which is mounted on the water cock to emit ultraviolet rays, in which the water cock includes a water inflow part which extends in a transverse direction and has a water inflow passage formed therein; and a water outflow part which extends in a direction intersecting the water inflow part at an end of the water inflow part and has a water outflow passage formed therein, in which the light emitting element is disposed on an upper side of the water outflow part, and in which the water outflow passage is configured to be connected to a plurality of chambers having different diameters from each other to form a stepped longitudinal sectional shape.

20 Claims, 9 Drawing Sheets

(51) Int. Cl.
*B67D 1/14* (2006.01)
*C02F 1/32* (2006.01)

(52) U.S. Cl.
CPC ............... *B67D 2210/00015* (2013.01); *C02F 2303/04* (2013.01); *C02F 2307/10* (2013.01)

(56) References Cited

U.S. PATENT DOCUMENTS

| | | | | |
|---|---|---|---|---|
| 6,186,361 | B1* | 2/2001 | Teetsel, III | B67B 7/26 |
| | | | | 222/1 |
| 7,976,883 | B2* | 7/2011 | Guerrero | A47J 31/41 |
| | | | | 426/232 |
| 8,137,538 | B2* | 3/2012 | Cassassuce | B01D 35/157 |
| | | | | 210/95 |
| 8,872,130 | B1* | 10/2014 | Matthews | C02F 1/325 |
| | | | | 250/455.11 |
| 9,370,273 | B2* | 6/2016 | Li | A47J 31/5253 |
| 9,526,371 | B2* | 12/2016 | Lo Foro | B65D 79/00 |

FOREIGN PATENT DOCUMENTS

| KR | 10-2009-0102144 | 9/2009 |
|---|---|---|
| KR | 10-2011-0061747 | 6/2011 |
| KR | 10-2014-0122138 | 10/2014 |

* cited by examiner

LIQUID DISPENSOR

CROSS-REFERENCE TO RELATED PATENT APPLICATIONS

This application is a U.S. National Stage Application under 35 U.S.C. § 371 of PCT Application No. PCT/KR2017/014972, filed Dec. 18, 2017, which claims priority to Korean Patent Application No. 10-2016-0172958, filed Dec. 16, 2016, whose entire disclosures are hereby incorporated by reference.

TECHNICAL FIELD

The present invention relates to a water purifier.

BACKGROUND ART

A water purifier can be defined as a device which filters harmful elements such as foreign substances or heavy metals contained in tap water.

A water purifying filter is used to purify the tap water flowing into the water purifier, and an ultraviolet sterilization method is used to sterilize the inside of a water cock from which water is discharged.

Korean Utility Model Registration No. 20-0393066 (Aug. 9, 2005) which is the related art discloses a structure for sterilizing water inside a water cock by mounting an LED which emits ultraviolet rays on an upper side of a water cock.

DISCLOSURE

Technical Problem

In a case of the related art, there are following problems.

Specifically, a part of light irradiated downward from the ultraviolet ray emitting LED mounted on an upper surface of the water cock may be exposed to the outside of the water purifier through the water cock, and the user may be injured by the exposed ultraviolet rays.

The present invention is proposed to solve the above problems.

Technical Solution

In order to achieve the above objective, according to an embodiment of the present invention, there is provided a water purifier which may include a housing accommodating components for generating cold water and/or hot water; and a water chute which protrudes from a front surface of the housing, in which the water chute includes a water cock through which cold water or hot water flows; and a light emitting element which is mounted on the water cock to emit ultraviolet rays, in which the water cock includes a water inflow part which extends in a transverse direction and has a water inflow passage formed therein; and a water outflow part which extends in a direction intersecting the water inflow part at an end of the water inflow part and has a water outflow passage formed therein, in which the light emitting element is disposed on an upper side of the water outflow part, and in which the water outflow passage is configured to be connected to a plurality of chambers having different diameters from each other to form a stepped longitudinal sectional shape.

Advantageous Effect

According to the water purifier according to the embodiment of the present invention configured as described above, there is an advantage that the ultraviolet rays irradiated downward from an inside of the water cock for sterilization can be minimized from being emitted to the outside of the water cock.

Specifically, even if the user puts his/her fingers directly under the work cock in the course of irradiation of ultraviolet rays for sterilization of an inside of the water cock, there is an advantage that the user is not injured by ultraviolet rays.

In addition, there is an advantage that the sterilizing power of the water remaining in the water cock can reach the maximum sterilization effect of 99.9%.

In addition, there is an advantage that a structure for shielding the lower end of the water cock is not needed to prevent the external exposure of ultraviolet rays during the sterilization mode.

BEST MODE

Hereinafter, a water purifier including a water cock sterilization module according to an embodiment of the present invention will be described in detail with reference to the drawings.

Figure 1:
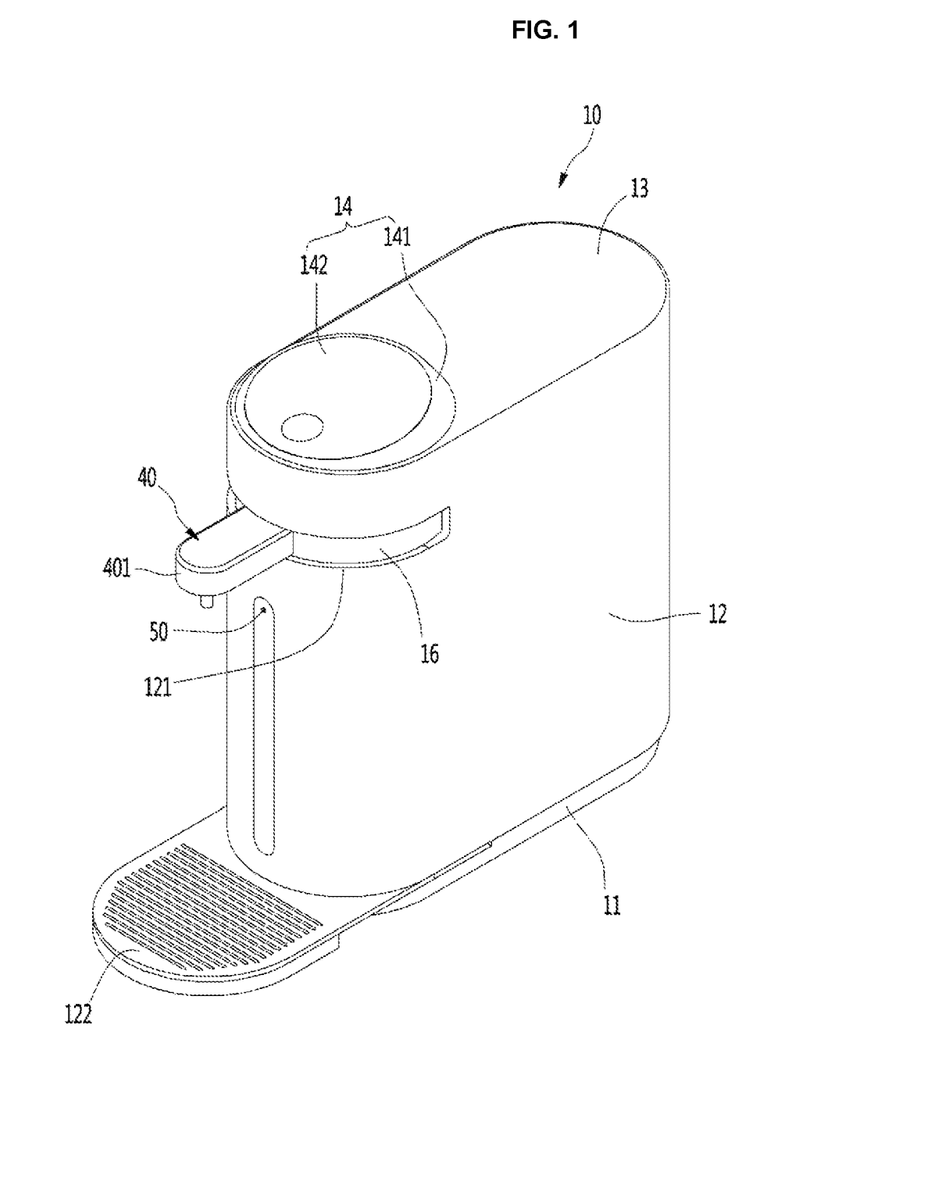
FIG. 1 is a perspective view illustrating a water purifier equipped with a water cock sterilization mechanism according to an embodiment of the present invention.

FIG. 1 is a perspective view illustrating a water purifier equipped with a water cock sterilization mechanism according to an embodiment of the present invention.

Referring to FIG. 1, the water purifier 10 according to the embodiment of the present invention may include a direct watering type cooling and heating water purifier for cooling or heating water directly supplied from an external water supply source and discharging the water, but is not limited thereto. In other words, the sterilization mechanism of the present invention can be also applied to a water purifier having a reservoir.

In detail, the water purifier 10 may include a base 11 constituting a bottom part, a housing 12 placed on an upper surface edge of the base 11, a cover 13 covering an opened upper surface of the housing 12, a control panel 14 formed on the upper surface of the cover 13, and a water chute 40 protruding from the outer circumferential surface of the housing 12.

More specifically, a part where the water chute 40 is formed may be defined as a front surface of the water purifier 10, and an opposite surface thereto may be defined as a rear surface of the water purifier 10.

In addition, the control panel 14 may be formed at a position close to the front end of the water purifier 10 and may be formed at a position close to the center part or the rear end of the water purifier 10 according to design conditions. In addition, the control panel 14 may be inclined in such a manner that the height of the control panel 14 increases toward the rear so that the control panel 14 can be easily recognized by the user's eyes positioned in front of the water chute 40.

In detail, the control panel 14 may include a panel main body 141 having a rear end protruding higher than the front end of the water purifier 10 from the upper surface thereof and a panel cover 142 covering the upper surface of the panel main body 141. In addition, the control panel 14 may include a plurality of operation buttons including a power button. For example, the operation buttons provided on the control panel 14 may include a power button, a water discharge button, a button for selecting the type of water to be discharged, a button for setting the water temperature, a button for setting the amount of water to be discharged, and the like.

In addition, the water chute 40 may be extended forward by a predetermined length from the front end of the water purifier 10 and may be rotatably mounted within a range of 90 degrees from the center of the front end of the water purifier 10 in a lateral direction, respectively. In other words, the water chute 40 can rotate 180 degrees in total. Of course, the water chute 40 may be fixed to the front surface of the housing 12.

In addition, a rotation guide 16 having a circular band shape may be mounted on the rear end of the water chute 40 so that the water chute 40 can rotate. The water chute 40 and the rotation guide 16 can be injection-molded into one body or can be formed as separate parts and joined as one body by a fastening member.

In addition, a guide hole 121 for guiding the rotation of the water chute 40 may be formed on the front surface of the housing 12 and the water chute 40 can rotate along the guide hole 121 by 90 degrees in the lateral direction. The water chute 40 may include a chute case 401.

In addition, a proximity sensor 50 for detecting the approach of the user is mounted on the front surface of the housing 12 so that in a case where the user approaches the water purifier 10 during sterilization, the proximity sensor can detect the approach of the user and thus can transmit the approach of the user to a control unit (not illustrated) of the water purifier. The control unit may be provided inside the control panel 14.

In addition, a tray 122 is mounted on the lower end of the front surface of the housing 12 so that a part of the water discharged from the water chute 40 or a water drop falling from the water chute 40 can be collected. The tray 122 may also be designed so as to be rotatable by a predetermined angle designed in the same manner as in the water chute 40 in the lateral direction.

Hereinafter, a sterilization mechanism according to an embodiment of the present invention provided in the water purifier will be described in detail with reference to the drawings.

In a state where the water chute 40 described below is removed, the water chute is described based on the drawings, and even if there is no description of the chute case 401, it is noted that the water chute 40 includes the chute case 401.

Figure 2:
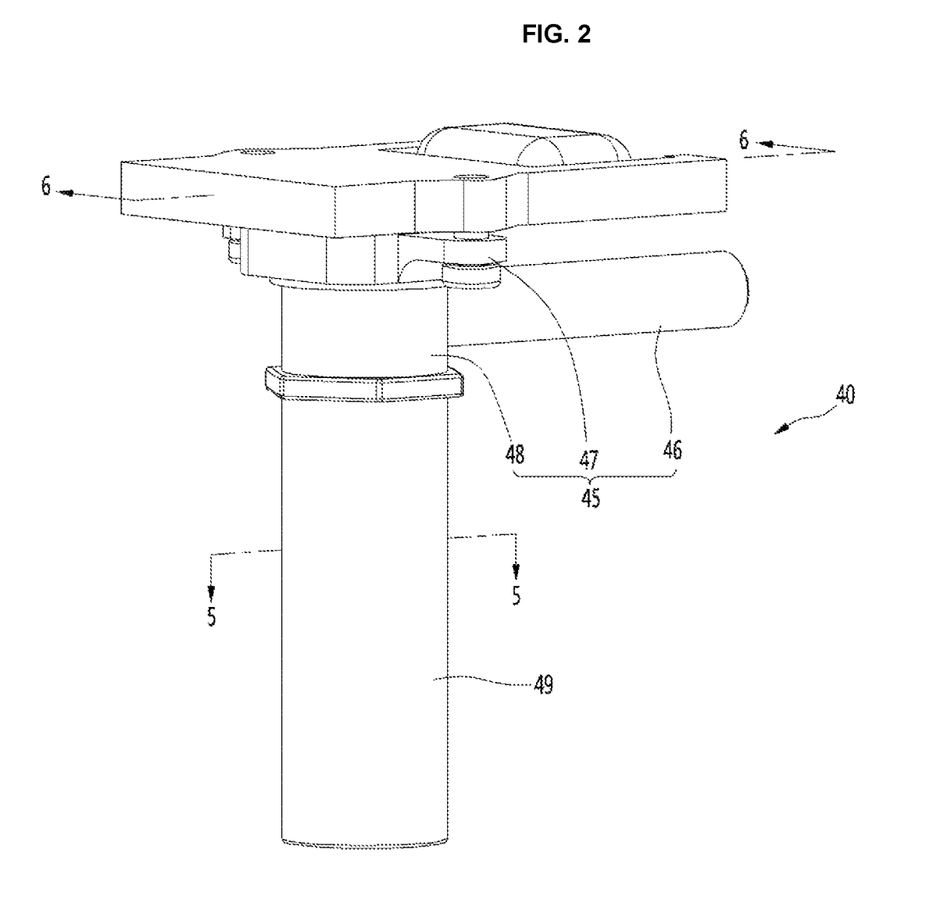
FIG. 2 is a perspective view illustrating a water chute in which a sterilization mechanism according to an embodiment of the present invention is provided and from which a chute case is removed.
Figure 3:
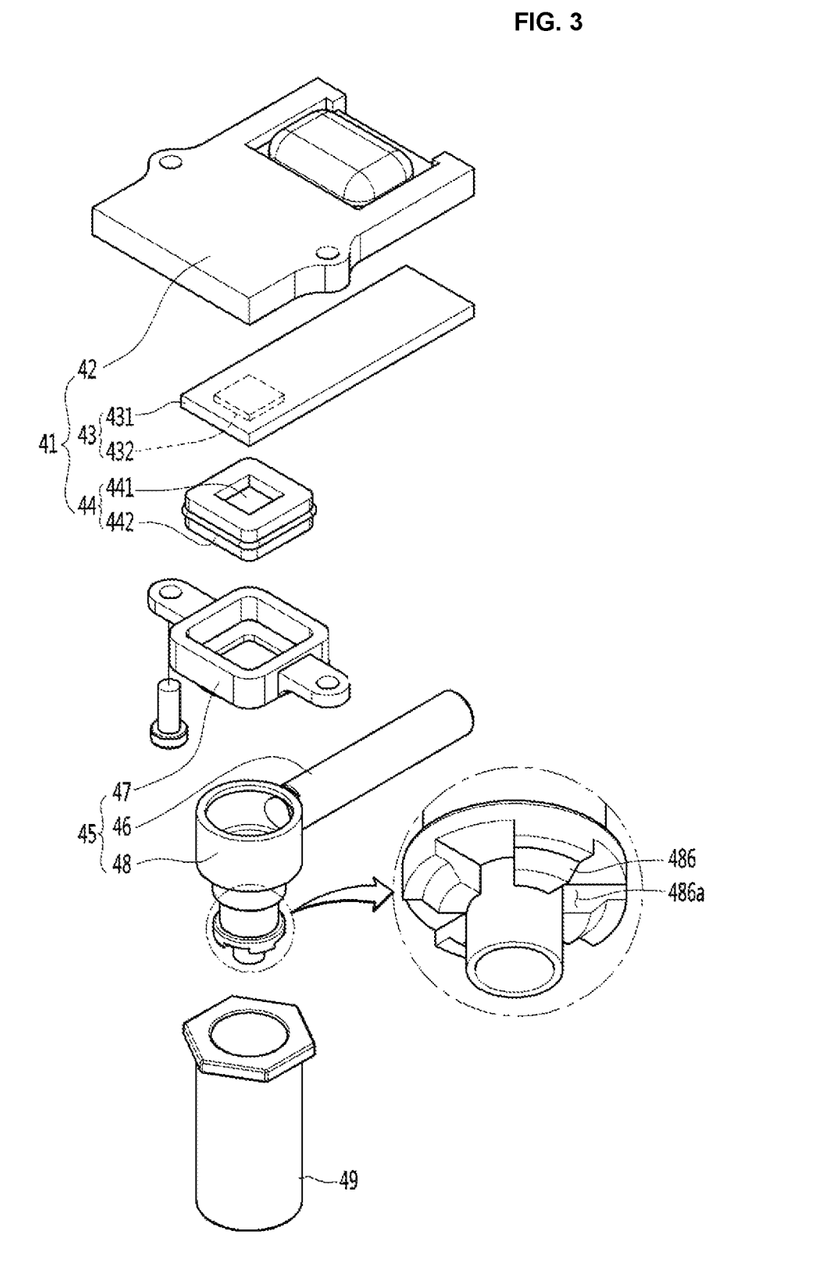
FIG. 3 is an exploded perspective view illustrating the water chute.

FIG. 2 is a perspective view illustrating a water chute in which a sterilization mechanism according to an embodiment of the present invention is provided and from which a chute case is removed and FIG. 3 is an exploded perspective view illustrating the water chute.

Referring to FIGS. 2 and 3, the water chute 40 according to the first embodiment of the present invention may include the chute case 401, a water cock accommodated in the chute case 401, a sterilization module 41 for sterilizing the interior of the water cock 45, and a safety guide 49 mounted on the water cock 45.

The sterilizing module 41 may include a light emitting unit 43, a bracket 42 on which the light emitting unit 43 is mounted, and a waterproofing unit 44 which is disposed on the lower side of the bracket 42.

In addition, the light emitting unit 43 may include a light emitting element 432 which emits ultraviolet ray, and a substrate 431 on which the light emitting element 432 is mounted. The light emitting element 432 may be an LED element which emits ultraviolet ray having a wavelength of 300 nm to 400 nm, specifically, a wavelength of 380 nm.

In addition, the waterproof unit 44 is installed to prevent water flowing along the inside of the water cock 45 from splashing toward the light emitting element 432. Specifically, the waterproof unit 44 may include a transparent plate 441, and a sealer 442 surrounding the edge of the transparent plate 441. The transparent plate 441 may have a rectangular shape, as illustrated, or may have a polygonal or circular plate shape in addition thereto. The transparent plate 441 may be made of plastic or glass material.

Meanwhile, the water cock 45 may include a water inflow part 46 extending in the horizontal direction, a water outflow part 48 extending in the vertical direction at the end of the water inflow part 46, and a waterproof unit seating part 47 formed at the upper end of the water outflow part 48. The waterproof unit seating part 47 may be fixed to the bottom surface of the sterilizing module 41 by being formed with the water outflow part 48 as one body.

Alternatively, as illustrated in the figures, the structure in which the waterproof unit seating part 47 may be provided as an independent component and thus the upper surface and the lower surface may be respectively fixed to the bottom surface of the sterilization module 41 and the upper surface of the water outflow part 48 is also possible. In order to minimize leakage, the waterproof unit seating part 47 may be configured as a part of the water outflow part 48.

In addition, a plurality of seating protrusions 486 may be spaced apart in the circumferential direction of the water outflow part 48 at the end of the water cock 45, specifically, at the lower end of the water outflow part 48. Specifically, the space between the adjacent seating protrusions 486 can be defined as a communication groove 486a, and the function of the communication groove 486a will be described in detail with reference to the drawings below. The seating protrusions 486 may extend downward as illustrated in the drawings but may be stepped toward the center of the water outflow part 45.

Figure 4:
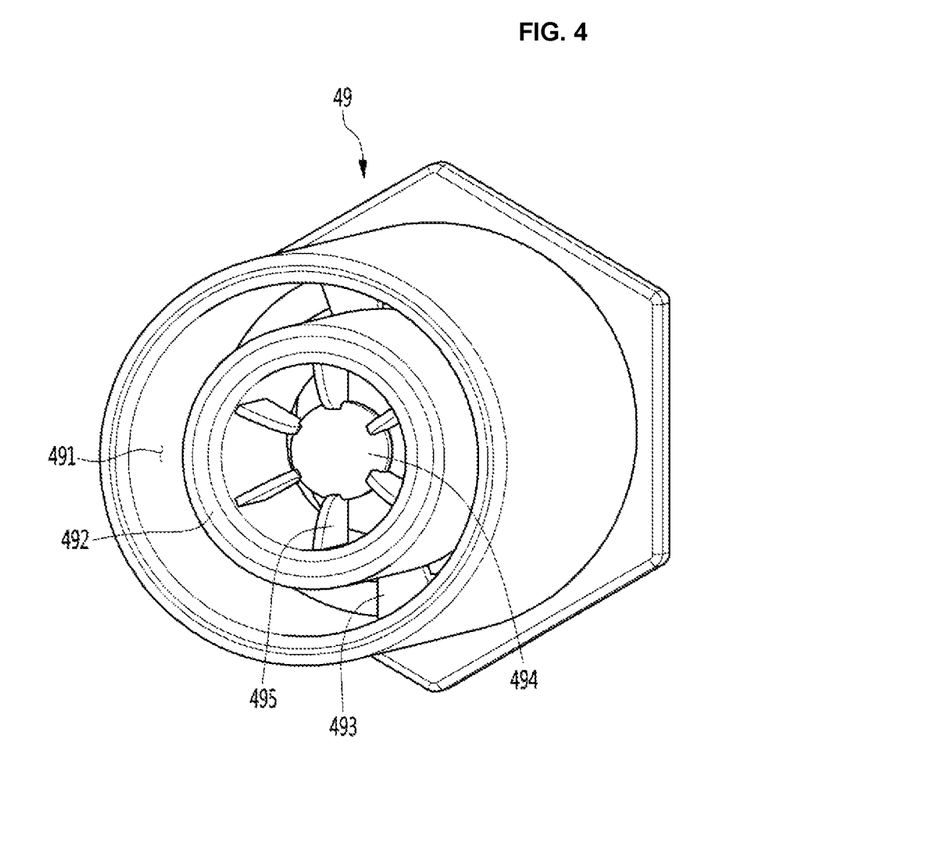
FIG. 4 is a bottom perspective view illustrating a safety guide constituting a water chute according to an embodiment of the present invention.
Figure 5:
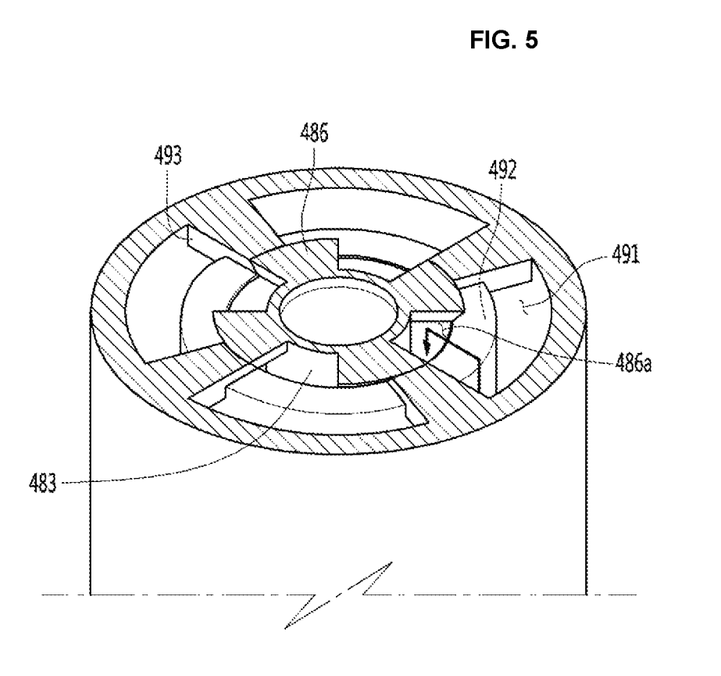
FIG. 5 is a cut-away perspective view taken along line 5-5 of FIG. 2.

FIG. 4 is a bottom perspective view illustrating a safety guide constituting a water chute according to an embodiment of the present invention, and FIG. 5 is a cut-away perspective view taken along line 5-5 of FIG. 2.

Figure 7:
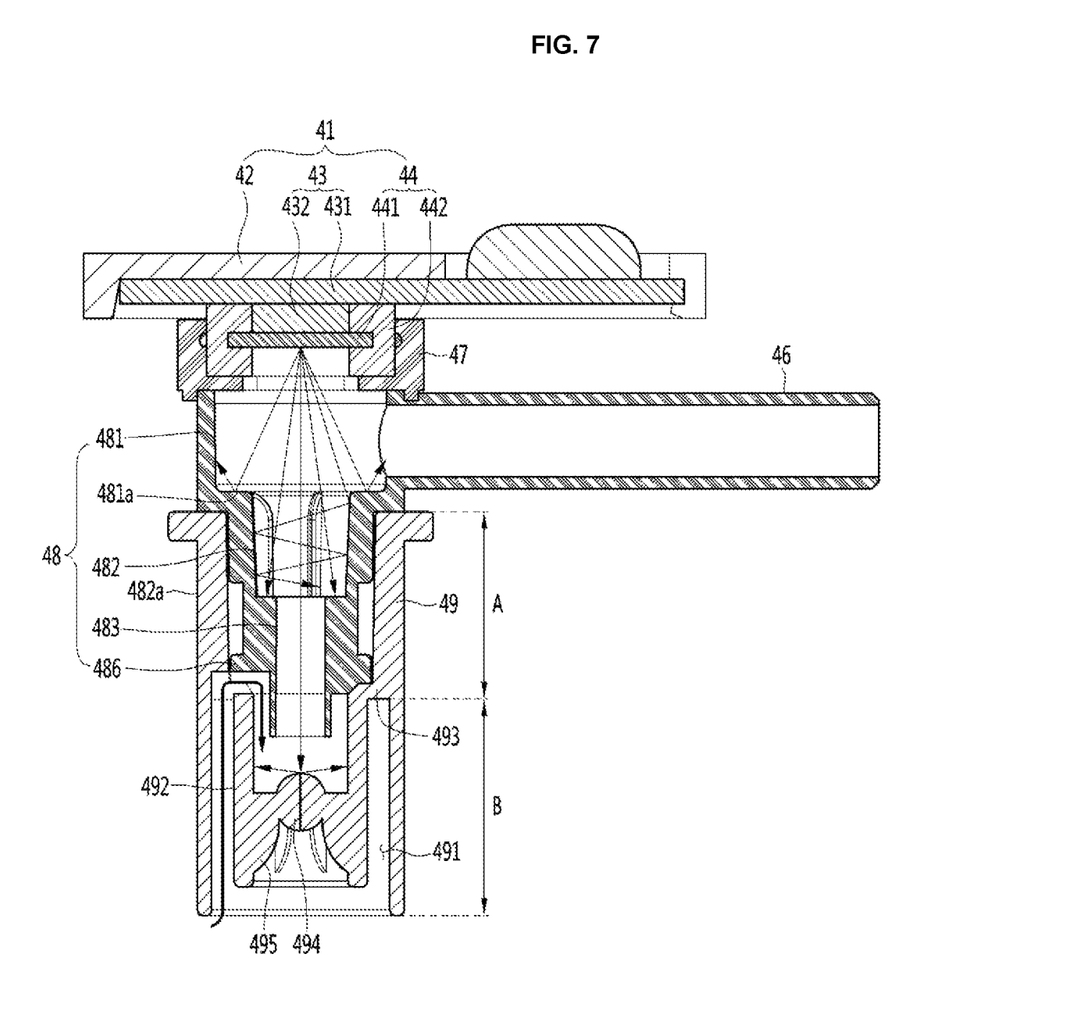
FIG. 7 is a longitudinal sectional view taken along line 6-6 of FIG. 2.

Referring to FIGS. 4 and 5, the safety guide 49 may have a hollow cylindrical shape and may be divided into a coupling section A, an inner space of which is coupled to the water outflow part 48 and a shielding section B in which a shielding space 491 is formed (see FIG. 7).

In detail, the shielding space 491 is formed to prevent ultraviolet rays emitted from the light emitting unit 43 from being leaked out of the safety guide 49. Therefore, the shielding space 491 is formed in the lower region of the water outflow part 48.

In addition, a plurality of seating ribs 493 protrude from the inner circumferential surface of the safety guide 49 corresponding to the lower end of the coupling section A and may be spaced apart from each other by a predetermined gap in the circumferential direction of the safety guide 49. The upper side may be defined as the coupling section A and the lower side may be defined as the shielding section B with respect to the seating rib 493 and the shielding space 491 is formed inside the safety guide 49 corresponding to the shielding section B.

When the safe guide 49 is fitted into the outer circumferential surface of the water outflow part 48, as illustrated in FIG. 5, the seating protrusions 486 protruding from the lower end of the water outflow part 48 may be seated on the seating ribs 493. In other words, a stepped part of the seating protrusion 486 is seated on the upper surface of the seating rib 493.

In addition, a screw thread is formed on the inner circumferential surface of the safety guide 49 corresponding to the coupling section A and on the outer circumferential surface of the water outflow part 48, and thus the safety guide 49 can be screwed to the outer circumferential surface of the water outflow part 48.

Alternatively, one or a plurality of friction rings may be provided on the inner circumferential surface of the safety guide 49 corresponding to the coupling section A, and thus the safety guide 49 can be coupled to the outer circumferential surface of the water outflow part section 48 by frictional force.

A cylindrical extended part 492 may be formed in the shielding space 491 and an upper end of the extended part 492 extends from the seating rib 493 toward the lower end of the shielding space 491.

The lower end of the extended part 492 extends to a position spaced upward from the lower end of the safety guide 49 so that the extended part 492 is not exposed to the outside.

The outer diameter of the extended part 492 is smaller than the diameter of the shielding space 491 (or the inner diameter of the safety guide 49) so that an air passage is formed between the inner circumferential surface of the safety guide 49 and the outer circumferential surface of the extended part 492.

The inner space and the outer space of the extended part 492 can communicate with each other by the communication groove 486*a* formed between the adjacent seating protrusions 486. Therefore, air rising along the air passage flows into the inner space of the extended part 492 through the communication groove 486*a*. As a result, in a process of the extraction of potable water, it is possible to prevent the residue water from being formed in the extended part 492 by the inner space of the extended part 492 being a state of being vacuumed.

Meanwhile, a spherical light shielding ball 494 is disposed at the center of the inside of the extended part 492 and thus the light shielding ball 494 is supported by a plurality of ball supporting ribs 495 extending from the inner circumferential surface of the extended part 492. The ball supporting ribs 495 are spaced apart from each other in the circumferential direction of the extended part 492, and the potable water to be discharged is discharged to the space between the ball supporting ribs 495.

The light shielding ball 494 is provided so as to reflect ultraviolet rays which have passed through the water outflow part 48 and not to leak to the outside of the safety guide 49 and can be positioned directly below the outlet end of the water outflow part 48. The diameter of the light shielding balls 494 may be equal to or larger than at least the inner diameter of the lower end of the water outflow part 48.

Figure 6:
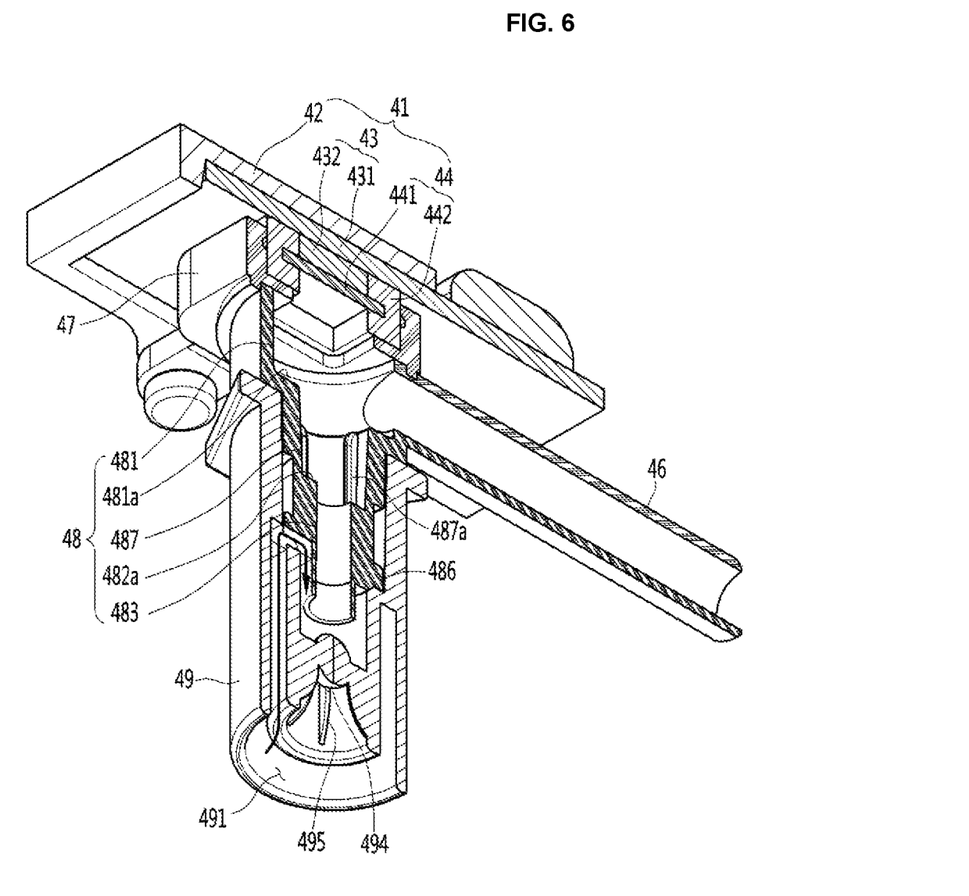
FIG. 6 is a cut-away perspective view taken along line 6-6 of FIG. 2.

FIG. 6 is a cut-away perspective view taken along line 6-6 of FIG. 2.

Referring to FIGS. 6 and 7, a water collecting part 481, a first chamber 482, and a second chamber 483 may be formed in the water outflow part 48.

The first chamber 482 and the second chamber 483 may be defined as a water outflow passage.

The water collecting part 481 may be defined as a part of the water inflow passage formed inside the water inflow part 46 or may be defined as a part of the water outflow passage.

In detail, the water collecting part 481 is a space in which the water flowing into the water inflow port 461 is gathered before falling to the water outflow part 48. In other words, the water collecting part 481 has a cylindrical shape having a predetermined diameter and depth (or length), and a discharge port of the water inflow port 461 may be formed on a side surface of the water collecting part 481.

The diameter of the upper end of the first chamber 482 may be smaller than the inner diameter of the water collecting part 481 and the stepped part 481*a* may be formed at the lower end of the water collecting part 481.

The first chamber 482 may be a sloping part having a truncated cone shape in which the cross-sectional diameter progressively decreases toward the lower end. Alternatively, it may be a straight part having a cylindrical shape with a constant diameter at the upper end and the lower end.

The upper end of the second chamber 483 may have a smaller diameter than the lower end diameter of the first chamber 482 and thus a stepped part 482*a* may be formed at the lower end of the second chamber 483. Here, the stepped part 481*a* formed at the lower end of the water collecting part 481 may be defined as a first stepped part and the stepped part 482*a* formed at the lower end of the first chamber 482 may be defined as a second stepped part.

Also, the second chamber 483 may have any one of the sloping part and the straight part, as in the first chamber.

As described above, the water outflow passage formed in the water outflow part 48 does not have a structure in which the cross-sectional diameter thereof is continuously and linearly reduced, but has a structure in which the cross-sectional diameter thereof is reduced discontinuously and non-linearly. Here, the shape of the longitudinal section of the passage which is reduced discontinuously and nonlinearly can be defined as a stepped longitudinal section shape. In other words, the water outflow passage has a structure in which a plurality of chambers are connected, and the diameter of the lower end of the upper chamber is larger than the diameter of the upper end of the lower chamber so that the stepped part is formed at the boundary part. Each of the chambers has a conical shape or a cylindrical shape.

In addition, the lower end of the water outflow part 48 forming the second chamber 483 extends further than the lower end of the seating protrusion 486 so that when the safety guide 49 is engaged, the lower end of the water outflow part 48 can be positioned in the extended part 492. However, it is not necessarily limited to this, and the lower end of the second chamber 483 and the lower end of the seating protrusion 486 may be placed on the same plane.

In addition, the diameter of the light shielding balls 494 may be at least equal to or greater than the inner diameter of the lower end of the second chamber 483 so that the ultraviolet rays emitted through the second chamber 483 may be reflected from a surface of the light shielding balls 494, and thus it is preferable that So that the ultraviolet rays are not leaked to the outside of the safety guide 49.

In addition, one or a plurality of partition ribs 487a may be formed on the inner circumferential surface of the first chamber 482. One or a plurality of partition ribs may be formed on the inner circumferential surface of the second chamber 483.

The partition ribs 487a of the first chamber 482 may be aligned with the partition ribs formed on the inner circumferential surface of the second chamber 483. Alternately, the partition ribs 487a formed in the first chamber 482 and the partition ribs formed in the second chamber 483 may be spaced apart from each other in the circumferential direction of the water outflow part 48 to be alternately disposed. In this case, the compartment ribs may function as a resistance structure to reduce the flow rate of water through the water outflow part 48.

Meanwhile, as illustrated in FIG. 7, the light emitted from the light emitting element 432 is diffused in a lambertian form. Accordingly, a part of the light emitted from the light emitting element 432 is reflected by being collided with the first step part 481a and the second step part 482a, and thus is extinguished inside the water cock 45.

The light emitted from the light emitting element 432 and passing through the second chamber 483 is reflected from the surface of the light shielding ball 494 and is extinguished. In addition, in a case where the first and second chambers 481a and 482a are sloping parts, the light is reflected from the surface of the sloping part many times and is extinguished without passing through the water outflow part 48.

Like this, the ultraviolet rays emitted from the light emitting element 432 are irradiated to the inner circumferential surface of the water outflow part 48 to sterilize the residual water remaining in the inner circumferential surface of the water outflow part 48 and in the inner part of the water outflow part 48. The ultraviolet rays emitted from the light emitting element 432 are reflected many times by the internal structure of the water outflow part 48 and the light shielding balls 494 and are extinguished without being discharged outside the safety guide 49. Therefore, it is possible to prevent the user from being injured by the ultraviolet rays in the sterilization mode.

Meanwhile, an arrow indicated in FIGS. 6 and 7 illustrate a state where the indoor air flows into the extended part 492 through the air passage formed inside the safety guide 49.

Figure 8:
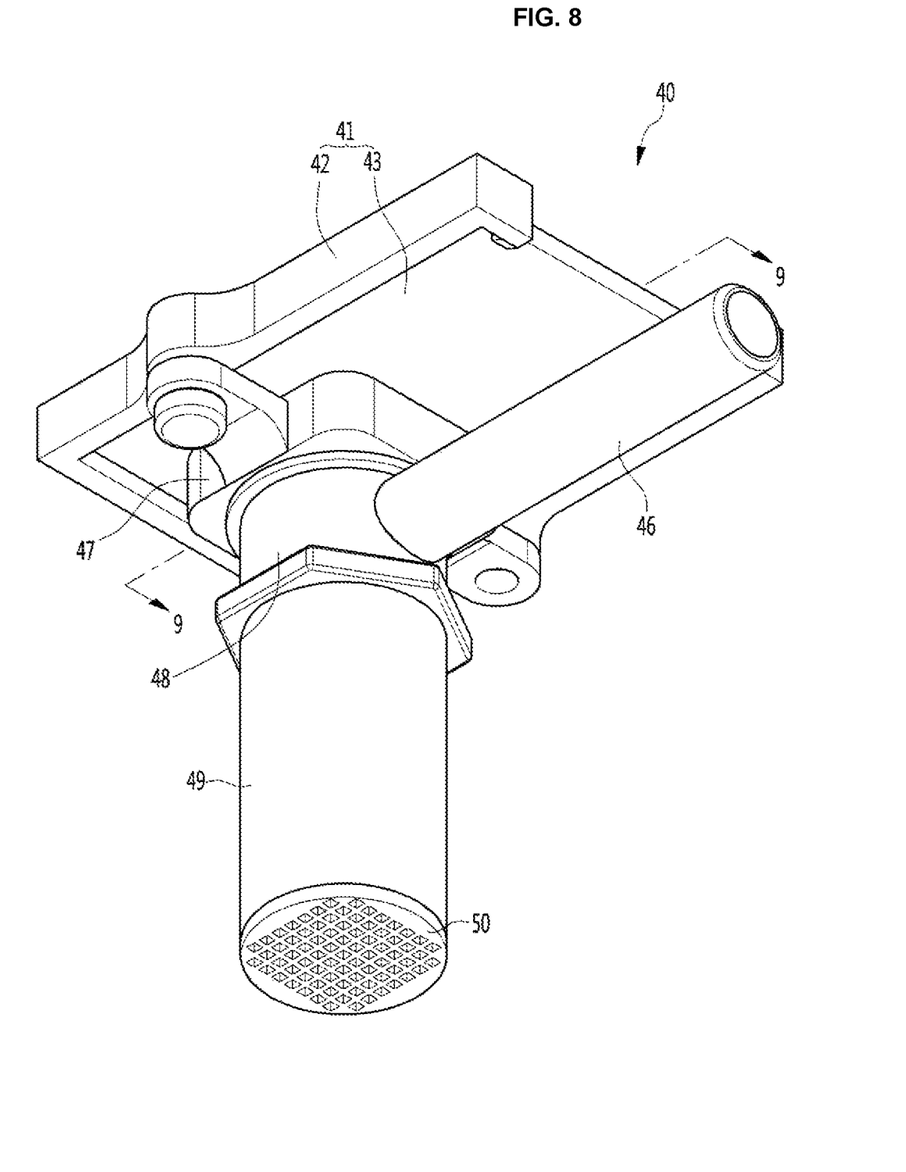
FIG. 8 is a bottom perspective view illustrating a water chute according to another embodiment of the present invention.
Figure 9:
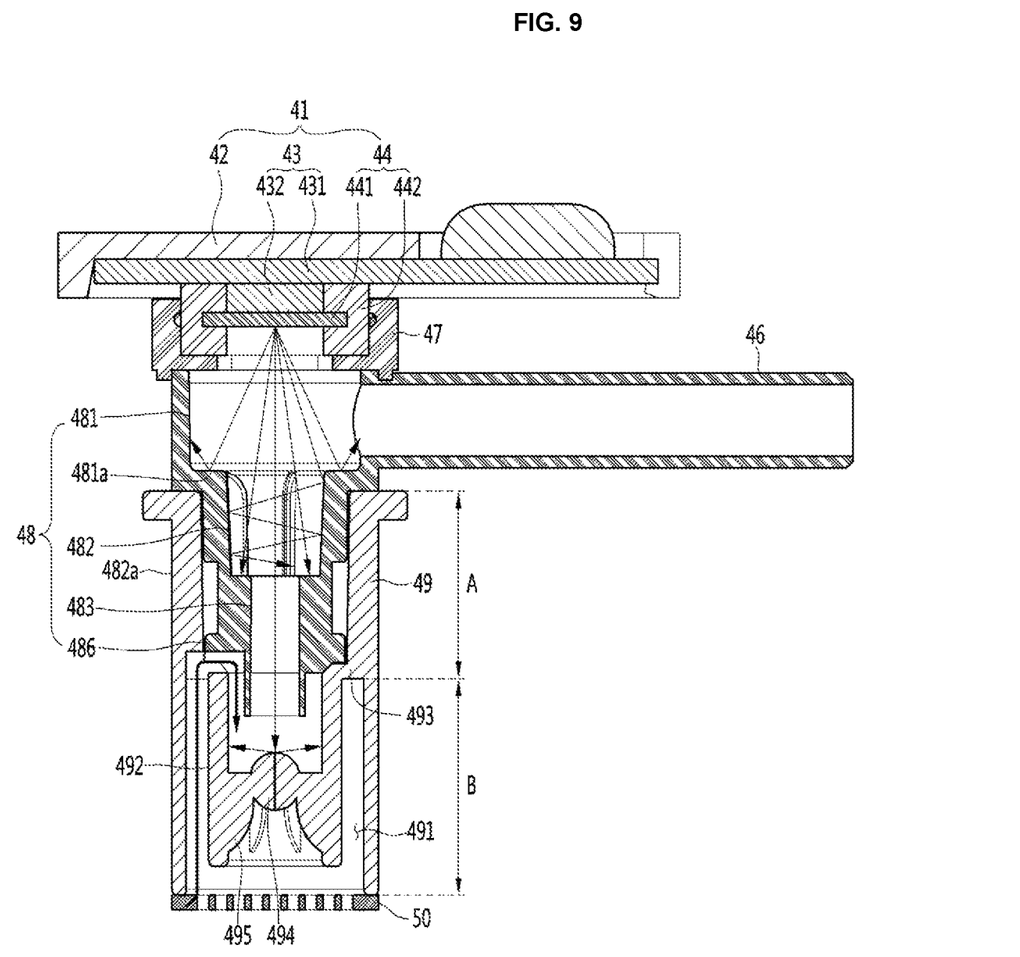
FIG. 9 is a longitudinal sectional view taken along line 9-9 in FIG. 8.

FIG. 8 is a bottom perspective view illustrating a water chute according to another embodiment of the present invention, and FIG. 9 is a longitudinal sectional view taken along line 9-9 in FIG. 8.

Referring to FIGS. 8 and 9, the water chute 40 according to the present embodiment is characterized in that a light shielding mesh 50 is further added to the water chute 40 described in the previous embodiment.

Specifically, the light shielding mesh 50 is mounted on the lower end of the safety guide 49 so that the external leakage of ultraviolet rays emitted to the outside of the safety guide 49 can be double-blocked without being reflected by the light shielding ball 494.

In other words, the ultraviolet rays which do not collide the light shielding balls 494 and go straight ahead are scattered by colliding with a mesh densely formed in a lattice pattern, or reflected into the safety guide 49.

The invention claimed is:

1. A liquid dispenser comprising:
a housing accommodating components for generating at least one of a cooled liquid or a heated liquid; and
a chute which protrudes from a surface of the housing, wherein the chute includes
a cock through which at least one of the cooled liquid, the heated liquid, or another liquid flows; and
a light emitting element which is mounted on the cock to emit ultraviolet rays,
wherein the cock includes:
an inflow part which extends in a transverse direction and has an inflow passage formed therein; and
an outflow part which extends in a direction intersecting the inflow part and at an end of the inflow part, and which has an outflow passage formed therein,
wherein the light emitting element is disposed above the outflow part, and
wherein the outflow passage is configured to be connected to a plurality of chambers having respective different diameters to form a stepped longitudinal sectional shape.

2. The liquid dispenser of claim 1,
wherein the plurality of chambers include an upper chamber and a lower chamber, and
wherein a diameter of a lower end of the upper chamber is formed to be larger than a diameter of an upper end of the lower chamber such that a stepped part is formed at a boundary part between two adjacent ones of the chambers.

3. The liquid dispenser of claim 2,
wherein each of the plurality of chambers includes at least one of a truncated conical longitudinal section in which a cross-sectional diameter progressively decreases toward a lower-end thereof or a cylindrical longitudinal section having a same diameter in an upper end and a lower end thereof.

4. The liquid dispenser of claim 2,
wherein a plurality of partition ribs are formed on respective inner circumferential surfaces of one or more of the plurality of chambers, and
wherein the plurality of partition ribs are spaced apart from each other in a circumferential direction of the one or more chambers.

5. The liquid dispenser of claim 4,
wherein a portion of partition ribs are formed on inner circumferential surfaces of the upper chamber and the lower chamber, and one of the partition ribs formed on the inner circumferential surface of the upper chamber and one of the partition ribs formed on the inner circumferential surface of the lower chamber are aligned on a same line.

6. The liquid dispenser of claim 4,
wherein a portion of partition ribs are formed on inner circumferential surfaces of the upper chamber and the lower chamber, and ones of the partition ribs formed on the inner circumferential surface of the upper chamber and ones of the partition ribs formed on the inner circumferential surface of the lower chamber are disposed alternately in a circumferential direction of the outflow part.

7. The liquid dispenser of claim 1, further comprising:
a safety guide which is coupled to the outflow part,
wherein the safety guide includes into a coupling section in which the outflow part is fitted, and a shielding section which is formed at a lower side of the coupling section and has a shielding space formed therein, and wherein a plurality of seating ribs protrude from an inner circumferential surface of the safety guide corresponding to a boundary part between the coupling section and the shielding section.

8. The liquid dispenser of claim 7, wherein a plurality of seating protrusions protrude from a lower end of the outflow part, and wherein the plurality of seating protrusions are spaced apart from each other in a circumferential direction of the outflow part.

9. The liquid dispenser of claim 8, wherein the plurality of seating protrusions are seated on the plurality of seating ribs when the safety guide is coupled to the outflow part.

10. The liquid dispenser of claim 8, wherein the safety guide further comprises a cylindrical extension part extending from the end of the seating ribs into the shielded space.

11. The liquid dispenser of claim 10, wherein a seating groove, which is formed between two adjacent ones of the seating protrusions, and a space, which is formed between two adjacent ones of the seating ribs, communicate with each other when the safety guide is coupled to the outflow part, so that an outer space and an inner space of the extension part are fluidly connected with each other.

12. The liquid dispenser of claim 10, further comprising:
a light shielding ball which is disposed at an inner center of the extension part, and a plurality of support ribs which connect the inner circumferential surface of the extension part and the light shielding ball.

13. The liquid dispenser of claim 12, wherein the light shielding ball is disposed directly below the outflow passage, and wherein a diameter of the light shielding ball is equal to or larger than a diameter of the lower end of the outflow passage.

14. The liquid dispenser of claim 7, further comprising:
a mesh which is provided at the lower end of the safety guide.

15. The liquid dispenser of claim 1, further comprising:
a proximity sensor which is mounted on a front surface of the housing.

16. The liquid dispenser of claim 1, further comprising:
a transparent plate provided between the light emitting unit and the outflow passage.

17. The liquid dispenser of claim 16, further comprising:
a seating frame provided above the outflow part and configured to receive the transparent plate.

18. The liquid dispenser of claim 16, further comprising:
a bracket on which the light emitting unit is mounted, wherein the seating frame is coupled to the bracket.

19. The liquid dispenser of claim 1, wherein the ultraviolet rays have a wavelength of 300 nm to 400 nm.

20. The liquid dispenser of claim 7, wherein the safety guide is coupled to an outer circumferential surface of the outflow part.

* * * * *